No. 710,010. Patented Sept. 30, 1902.
W. & A. ROBERTSON.
COMBINED CUTTING AND COLLATING MACHINE.
(Application filed Nov. 2, 1901.)
(No Model.) 4 Sheets—Sheet 2.

WITNESSES INVENTORS

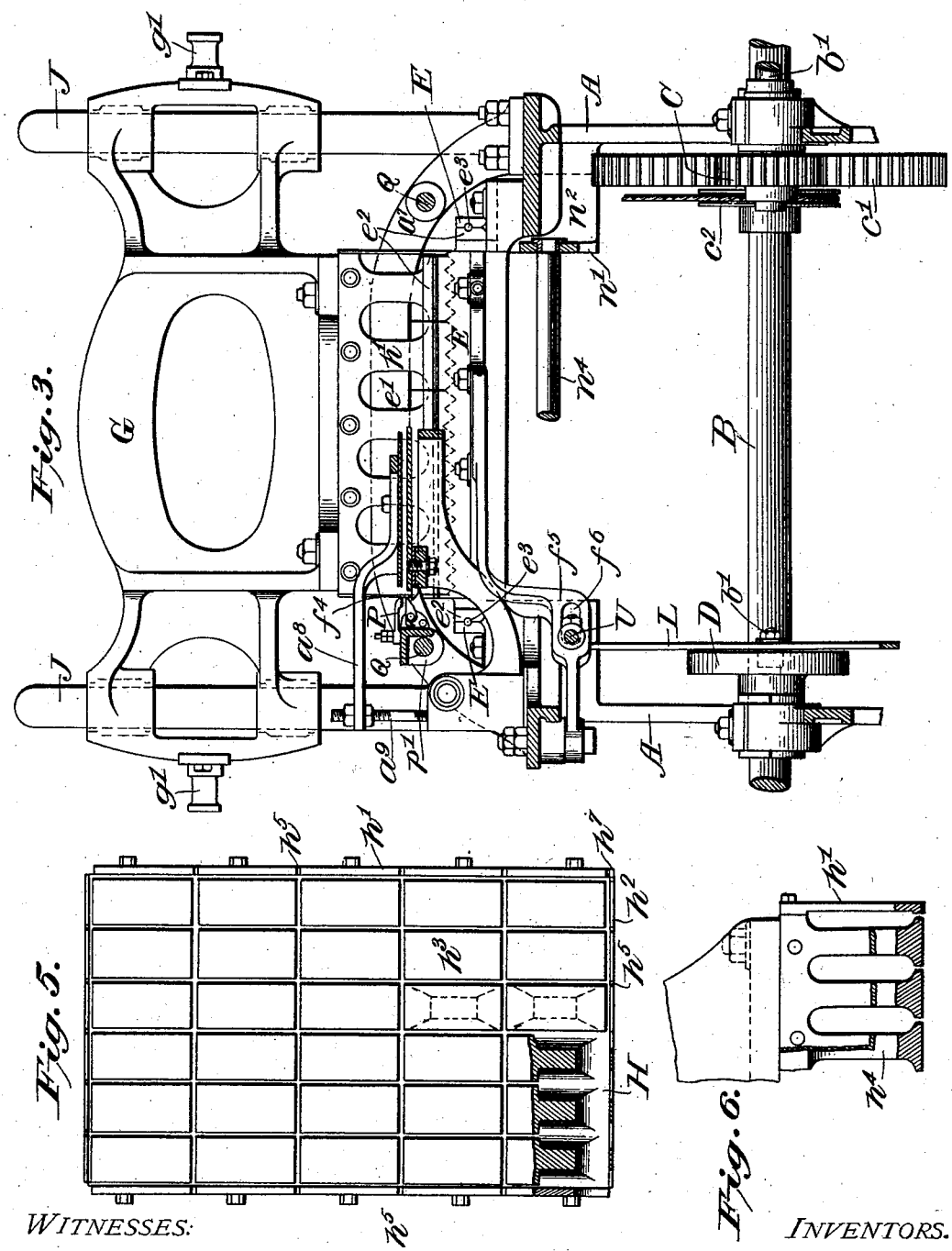

No. 710,010. Patented Sept. 30, 1902.
W. & A. ROBERTSON.
COMBINED CUTTING AND COLLATING MACHINE.
(Application filed Nov. 2, 1901.)
(No Model.) 4 Sheets—Sheet 4.
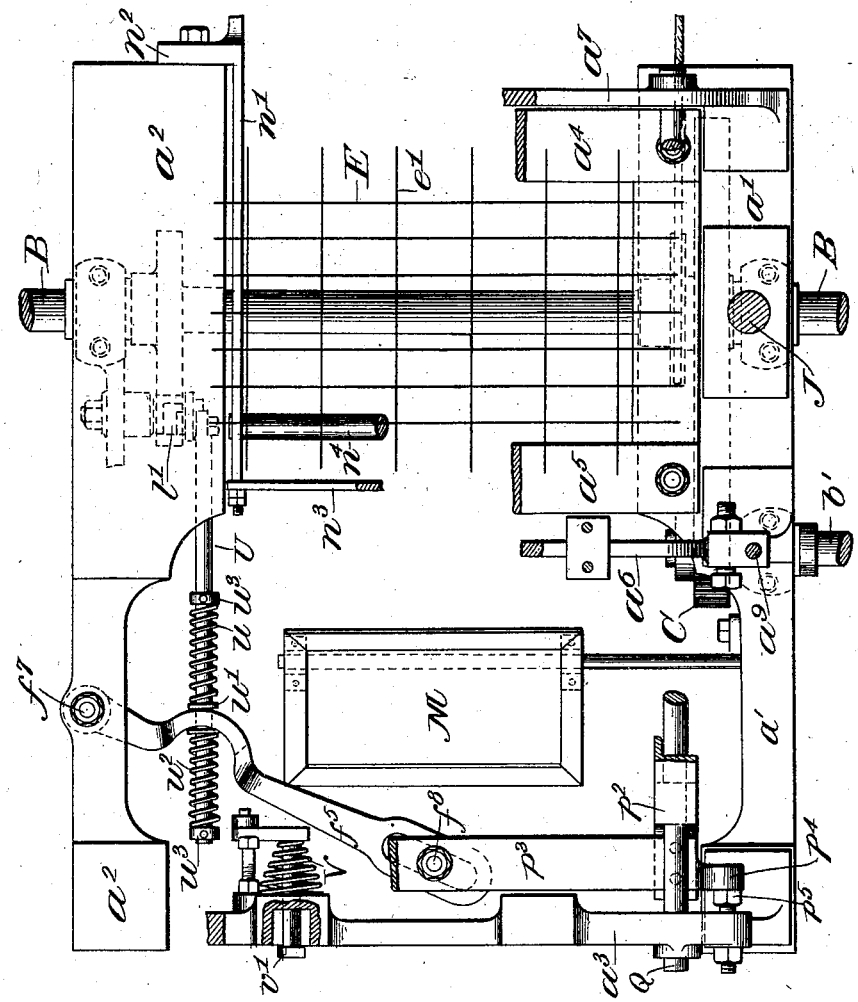
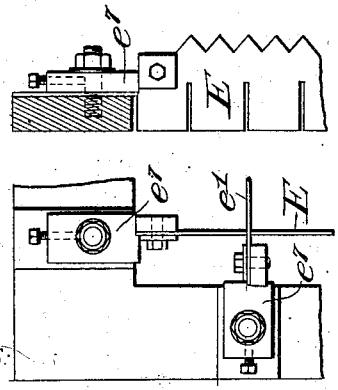
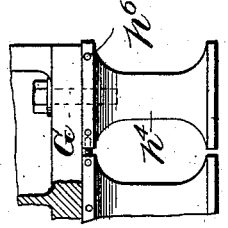
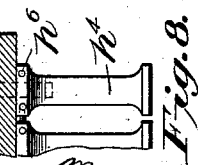
WITNESSES: INVENTORS.

UNITED STATES PATENT OFFICE.

WILLIAM ROBERTSON AND ANDREW ROBERTSON, OF GLASGOW, SCOTLAND.

COMBINED CUTTING AND COLLATING MACHINE.

SPECIFICATION forming part of Letters Patent No. 710,010, dated September 30, 1902.

Application filed November 2, 1901. Serial No. 80,916. (No model.)

*To all whom it may concern:*

Be it known that we, WILLIAM ROBERTSON and ANDREW ROBERTSON, engineers, subjects of His Britannic Majesty King Edward VII, residing at 62 Argyle street, in the city of Glasgow, Scotland, have invented certain new and useful Improvements in a Combined Cutting and Collating Machine, as set forth, of which the following is a specification.

The invention relates to combined cutting and collating machines, more especially to those for cutting up sheets of wafer-biscuits and the like.

It has for its chief objects to trim such sheets and cut them into any required number of separate pieces at one operation of the machine, and by a repetition of such operations to collate and pile together the separated pieces into heaps, packs, or quantities without handling them in readiness for packing.

The invention will be better understood if reference is made to the accompanying drawings, in which—

Figure 1:
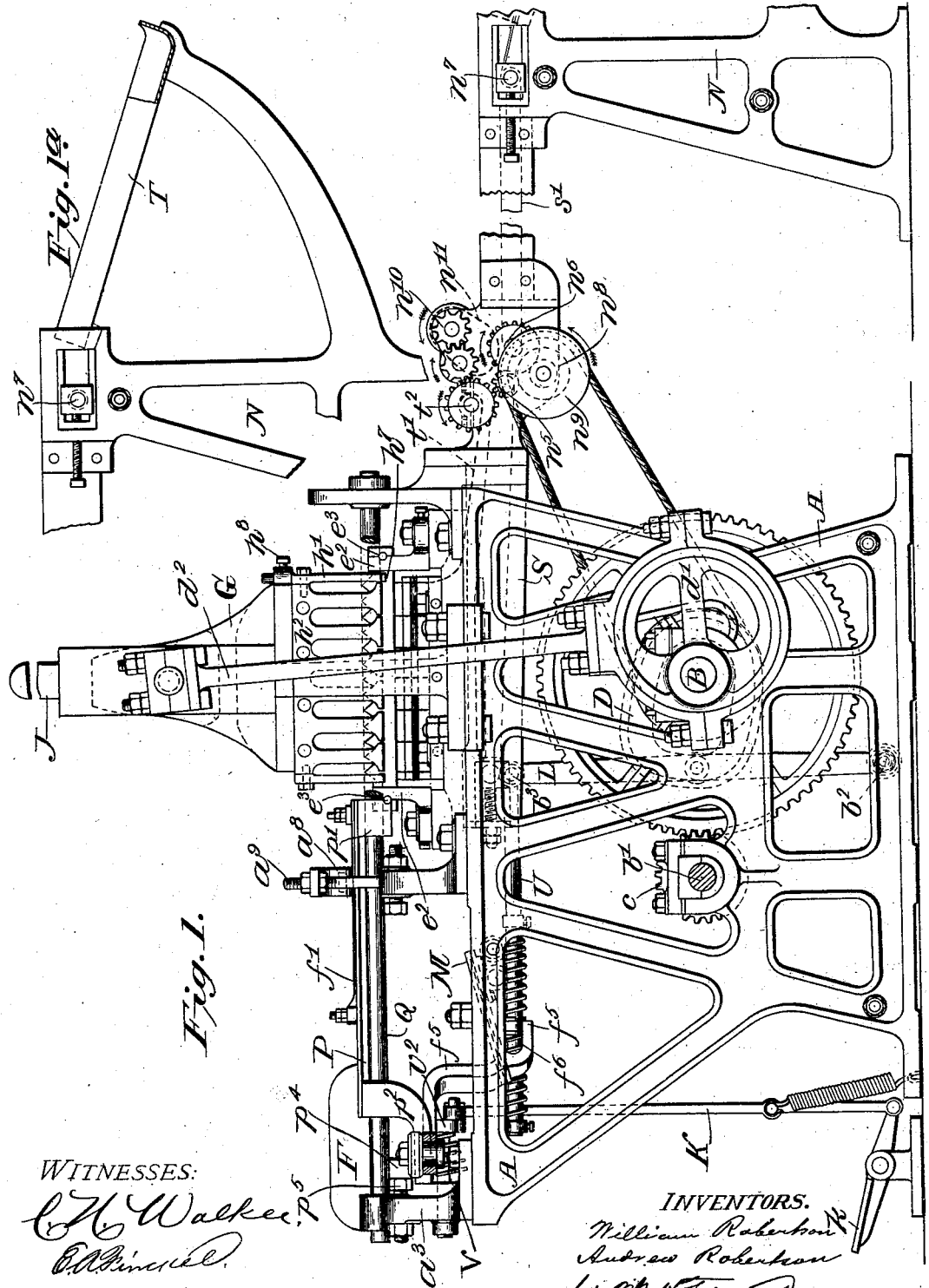
Figure 2:
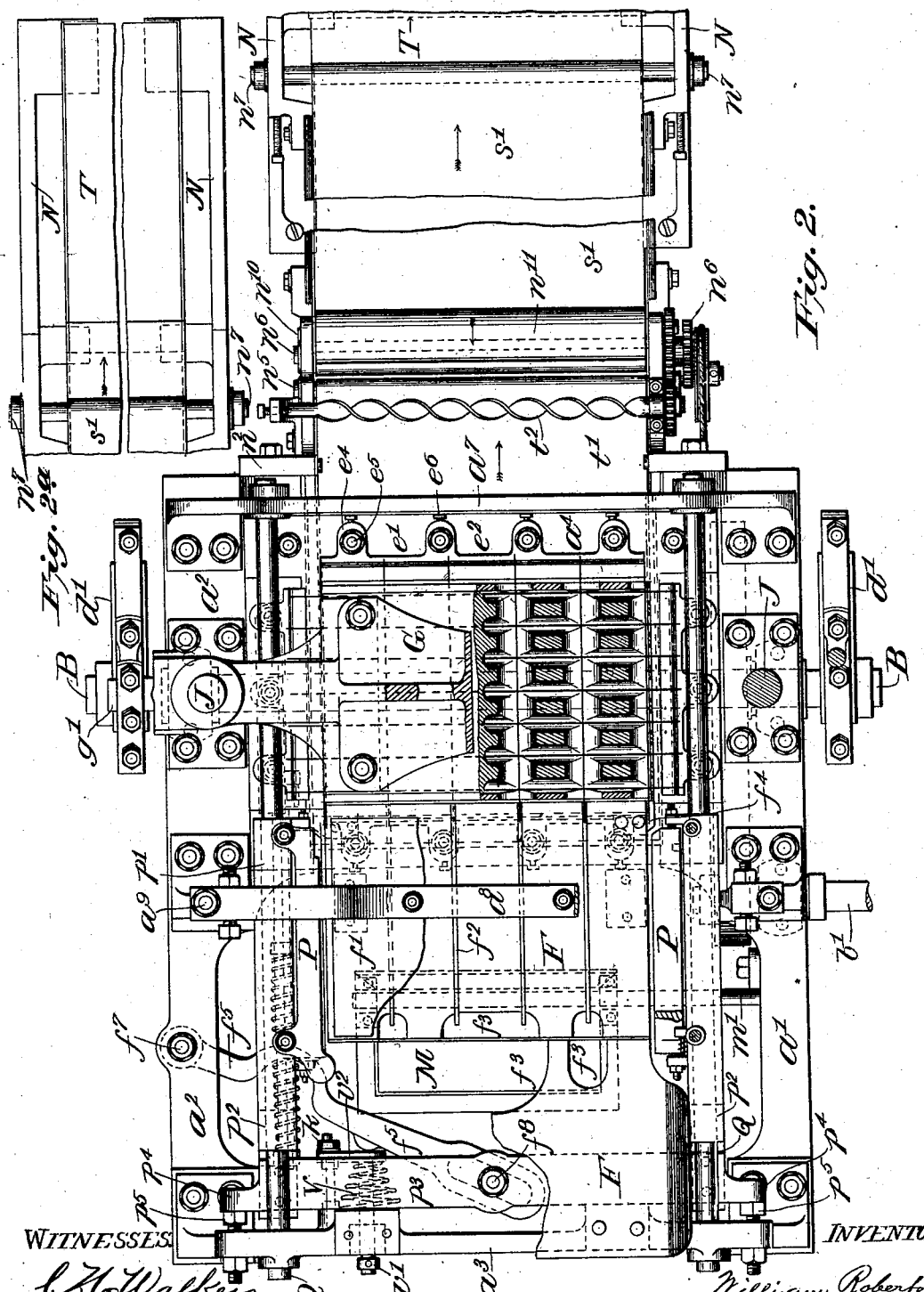

Figure 1 is a broadside view in elevation showing the frame supporting the driving-shafts, spur-wheels, and eccentric cams for operating the various parts of such a cutting-machine. The feeding-table and vertical stationary knives with serrated edges and head-stock, which carries the plungers for moving vertically between the knives, vertical and horizontal slide-rods, treadle spring-brake, reciprocating levers with rod and springs, mirror-gage, biscuit-collating and other devices, the frame of the collating devices being fractured for shortening the drawing; and Fig. 1$^a$ is a similar view of the right-hand end of the machine partly fractured to complete Fig. 1. Fig. 2 is a plan view of the same machine, representing the top of the frame, also parts of driving mechanism, head-stock, plungers, and vertical slide-rods partly in section, feeding-table and its brackets partly fractured, exposing reciprocating spring-lever, mirror and other feeding gages, grippers, gripper slide-rods, treadle-brake, spiral crumb-scraper, and biscuit-collating webs, tray, and other devices also fractured; and Fig. 2$^a$ is a similar view of the right-hand end of the machine fractured and to complete Fig. 2. Fig. 3 is a fragmentary view in elevation across the feeding end of the machine, showing the head-stock mounted upon its vertical slide-rods, lower transverse knives with serrated edges, parts of driving and biscuit-collating gear, feeding-table, gripper and gripper-rods in section, vertical cam (and slotted) levers, supporting-brackets, and other details. Fig. 4 is a fragmentary fractured plan view showing parts of the machine's frame, details of mirror-gage, slotted lever of gripper-frame with spring-rod and actuating-cam, also spring-brake, relative positions of cutting-knives, and other details. Fig. 5 is a plan view showing the under side of a set of plungers with apertures for knives to traverse. Figs. 6, 7, and 8 are fragmentary views, partly in section, showing details of the plungers. Figs. 9 and 10 are fragmentary views, partly in section, showing details of the knives.

Similar letters of reference and numerals throughout the illustrations indicate corresponding parts.

A description in brief of a biscuit-cutting machine with collating devices made in accordance with this invention is as follows:

Fixed to the frame A of the machine shown in the drawings is a horizontal feeding-table F with various gages, spur-wheel driving mechanism B C, and having horizontal slide-rods Q, with grippers P to the right and left of it. Sheets of wafer-biscuits are fed face downward to gages upon or about the table F. The right and left selvages of the biscuit-sheet are caught in the grippers P, which are then moved along their slide-rods Q until the biscuit-sheet becomes stationary above a set of vertical sheet-steel knives E and beneath a stamping-block G, with a number of stampers or plungers H, corresponding to the number and shape of biscuits in the sheet, having also side-plate plungers $h'$ for the four selvage edges. This head-block G, with its stampers H, is made to move downward and press the sheet of biscuits upon the serrated edges of the stationary knife-blades, which pass up into ("saw-gate") spaces $h^5$ between the plungers H, and the whole of the biscuits are simultaneously severed by one stroke and cleared of their selvages. The biscuits are pushed down through the knives E and are received upon a canvas or other endless (moving) web S, whence they are arranged in piles or packs by automatic collating devices, while the stamping-block G H rises again above the knives E. The grippers P are moved back to their original positions alongside the feeding-table F and are kept open until they flank the sheet of biscuits, which is laid face downward upon the feeding-table ready for cutting, when the grippers close and the process above described is repeated.

When the stamping-block G H descends, it presses down the outshot nether lips of the grippers P and keeps them open. While the grippers are thus agape they begin to move backward again, and projections on the nearest corners of the feeding-table F keep the grippers open until they are alongside of the next sheet of biscuit. When the outshot lips of the grippers have fully passed these sentinel projections, their springs come into action and close them upon the biscuit-sheet. They are then, with it, carried back to the knives E for cutting. These sentinel projections $f^4$ clear out the selvage-scraps of biscuit from between the grippers, while a sloping tray and other devices clear away the other selvage-scraps and discharge them where they can be collected into suitable receptacles.

The following description more particularly sets forth the various details of the invention.

A metal frame A, Fig. 1, is made for supporting the driving and other parts of the machine. The sides A $a'$ $a^2$, Fig. 2, of this frame are united together with the cross-bars $a^3$ $a^4$ $a^5$ and together with the girders $a^6$ $a^7$ $a^8$, Figs. 3 and 4, provide supports for the principal parts of the machine. The upright slide-rods J are mounted upon the sides $a'$ $a^2$, and the head-stock G is moved vertically upon them by means of two eccentrics $d'$ and rods $d^2$, united to the driving-shaft B and trunnions $g'$ of the head-stock. A plunger-block H $h'$ $h^2$, Fig. 5, is bolted to the under side of the part G and rises and descends with it. The block H comprises in these illustrations a series of thirty stampers or plungers $h^3$, also two side plates $h'$ and two end plates $h^2$, bolted and screwed to the block H. The thirty stampers are united to the top plate of the block H by thirty shanks $h^4$, but are separated from each other on their faces only by narrow slots or saw-gates $h^5$, Fig. 5, for sheet-steel vertical knives E $e'$ to traverse. The covering-plates $h'$ $h^2$ are shaped and slotted correspondingly with the stampers to allow them to pass up and down between the knives E $e'$. The seven knives E, Figs. 3 and 4, and the six knives $e'$, Figs. 2, 3, and 4, are fitted within vertical saw-gates formed in the angled bands $e^2$, Figs. 2 and 3. Rods or tubes $e^3$, Fig. 3, are threaded through the ends of the knives E and $e'$ where they protrude beyond the slotted bands and repose in grooves which prevent the knives from moving vertically. These angled bands $e^2$ are fixed to the frame with bolts passing through slotted lugs $e^4$ and are adjusted by means of the small screws $e^6$, as shown in detail in Figs. 9 and 10. These knives are preferably serrated on their cutting edges, and each parallel set is either superimposed above or beneath the transverse set, as shown in Figs. 1 and 3, or are slotted and intersected, as indicated in Figs. 9 and 10. These last-named figures indicate an alternative but more expensive method of uniting each individual knife E and $e'$ to the framework by means of numerous brackets $e^7$. Figs. 7 and 8 represent an alternative way of fixing each separate plunger to the head-stock G and spacing them apart one from another by means of small screw-pegs $h^6$.

The feeding-table F is fixed to and supported by the girders $a^3$ $a^6$, Fig. 4, and a cover-plate $f'$ is fixed a little above and parallel with the face of the table by means of an adjustable bridge-girder $a^8$, mounted upon pillar-studs $a^9$, Figs. 1 and 3. The space between the table F and its cover-plate or duplicate $f'$ is regulated to suit the thickness of the biscuit-sheet (or sheets) by raising or lowering the bridge-girder $a^8$. This duplicate plate $f'$ is sometimes perforated and adapted for use as a gage. It is designed also to keep the biscuit-sheets flat while adjusting them (upon the table) to the gages. Sundry raised ribs $f^2$ are formed on the face of the table F for fitting into grooves on the face of the biscuit-sheet, and one or more apertures $f^3$ are made therein for use as gages, assisted by the mirror M beneath it. When the biscuit-sheet is laid face downward upon the table F, the grooves which divide the biscuits one from another are adjusted to one or more of the raised ribs $f^2$ upon the table, and the parts which cover the perforations in this table are reflected in the mirror M and by being visible enable the feeder to adjust the sheet accurately to the gages before the grippers close upon its edges. The rod $m'$ for supporting the mirror is fixed to the sides A of the machine.

The corner projections $f^4$ upon the table are for keeping open the grippers temporarily.

The gripper slide-rods Q are supported by the end bar $a^3$ and the bridge $a^7$, Figs. 2, 3, and 4. The grippers P are united to these slide rods Q by the blocks $p'$ and brackets $p^2$, the latter being connected to the cross-head $p^3$, Figs. 1 and 2. They are made to travel back and forward along the rods Q by the movement comprising the cam D, vertical rocking lever L, horizontal spring-rod U, and slotted lever $f^5$. This rocking lever L is connected at $b^2$ to the frame A and at $b^3$ to the rod U. It has a stud carrying a roller at $b'$, which enters the hollow race of the cam D and is actuated by the motions of the cam. The slotted lever $f^5$ is pivoted to the frame A at $f^7$ and to the cross-head $p^3$ at $f^8$ and is connected to the rod U by a sliding collar $u'$, and the spiral springs $u^2$ are controlled by the fixed collars $u^3$. As the rocking lever L is moved back and forward by the motions of the cam D the rod U, acting through the springs $u^2$, propels the grippers along their slide-rods by means of the pivoted arm $f^5$. When this gripper-frame P to $p^4$ is in its normal position, the horns $p^4$ abut against the bolts $p^5$, Figs. 1, 2, and 4. The buffer-spring V, Fig. 4, breaks the force with which the arm $f^5$ propels the gripper-frame into its position alongside the table, and the spindle $v'$, upon which the spring V is carried, is connected by the tab $v^2$ to the brake-rod K and treadle $k'$. To prevent the grippers closing upon a biscuit-sheet before it is ready, this treadle-brake can be operated, which moves the tab $v^2$ into contact with the rigid stud $v^3$ and prevents the gripper's cross-head $p^3$ making its full traverse. When its progress is thus arrested, the springs $u^2$ are still further compressed as the lever L completes its stroke, and the gripper-frame then begins to move back again while the grippers are still open. These several springs soften the movements of the gripper-frame and prevent its vibration. Both the upper and lower jaws of the grippers are controlled by springs for closing them, as indicated in Figs. 2 and 3. The upper jaws are sometimes divided into several short pieces instead of one long one, so that the parts may yield variously if the biscuit-sheet is curled at the selvages.

The lower jaw of each gripper protrudes slightly within the path of the descending plungers, and two corner-rods $h^7$, Fig. 2, fixed with adjusting-screws, protrude below the level of the other side plates $h' h^2$ and press down the lower jaws in advance of the side plungers. As the plungers descend the lower jaws are widely distended, and as they begin to move back they bear against the protruding corners $f^4$ upon the table F and cannot close until they have moved beyond them. When the lower jaws have moved beyond the parts $f^4$, they close upon the biscuit-sheet laid to the gages upon the table F, and their course is then reversed.

Two arms $n'$, connected to the frame A at $n^2$ and to each other by the cross-bar $n^3$, Figs. 3 and 4, support the roller $n^4$, which, in conjunction with the roller at $n^5$, mounted in the frame N, support an endless web S for receiving the biscuits as they are pressed through the knives E $e'$. Another endless web $s'$ is supported by other two rollers at $n^6$ $n^7$. These webs are moved away from the knives in the direction shown by two of the arrows in Fig. 2 by means of a spur-wheel $n^8$, connected to the driving-pulley $n^9$ and geared into others upon $n^5 n^6$ and driven from the pulley $C^2$, Fig. 3. A sloping tray T receives the biscuits as they are moved along by the traveling webs S $s'$. The dotted line $t'$ indicates a sloping metal plate, Figs. 1 and 2, for receiving selvage biscuit-scrap, and the revolving worm $t^2$ clears it away, while geared to the wheel of this worm is a roller $n^{10}$, which supports a slack web tube or "trailer" $n^{11}$, made of rubber, felt, or other suitable material. This trailing tube $n^{11}$ rests without any other pressure than its own weight upon the biscuits as they are moved along by the web S to the web $s'$. This slack tube with its trailing motion derived from the slow revolution of the roller $n^{10}$ contributes to pile the moving biscuits upon the edges of those before them in a sloping position, and as they are in that position moved on toward the upturned end of the sloping tray T they eventually assume a vertical or semivertical position in readiness for being filled into boxes. This trailer $n^{11}$ is stationed beyond the termination of the web S and over that marked $s'$, the latter being on a slightly-lower plane and moving at a slower speed than the former. Guides are inserted within the open ends of the tube $n^{11}$ to keep it in an elliptical form inclined toward the knives and afford it a broad bearing-surface where it lies upon the biscuits. The wheels $n^5 n^8$ are geared so as to clear one batch of biscuits from under the knives as the next batch is pushed through them on to the web S.

A driving pulley or handle is fitted upon the shaft $b'$ of the pinion-wheel C, from which the wheel $c'$, with its shaft B and the other moving parts of the machine, are operated by manual, steam, or other motive power.

Having now described our invention, what we claim as new, and desire to secure by Letters Patent, is—

1. A combined cutting and collating machine, comprising a supporting-frame to which is attached a rigid feeding-table with mirror and other registering guides, a set of spring-grippers adapted for being moved upon slide-rods, gripper slide-rods, a set of knives vertically fixed in "saw-gates" contained in adjustable bars, a set of plungers (fixed to a head-stock) adapted for being moved vertically between the knives, a head-stock for carrying a set of plungers fitted to vertical slide-rods, vertical slide-rods for the head-stock, a cam, spring-rod, slotted lever and other devices for operating the grippers, traveler webs and tray with trailer web or tube device and driving mechanism all substantially as and for the purposes herein described.

2. A machine for cutting up sheets of baked biscuits and collating the severed biscuits, comprising a supporting-frame, a rigid feeding-table, registering guides thereon including a mirror, a set of spring biscuit-grippers, slide-rods upon which said grippers are movable, a set of saw-edged knives vertically fixed in "saw-gates" contained in adjustable bars, a set of plungers with "saw-gate" divisions adapted for fitting with precision between the knives, means to actuate said plungers, traveler webs and tray with trailer web or tube device and driving mechanism, substantially as described.

3. In a machine for cutting up sheets of baked biscuits, the combination of the registering devices comprising a perforated and ribbed feeding-table and a mirror permanently fixed beneath the said table and adapted for reflecting those parts of the embossed surface of a biscuit-sheet which cover the said perforations when the sheet is adjusted upon and to the ribs upon the perforated table, substantially as described.

4. In a machine for cutting up sheets of baked biscuits, the combination with two oppositely-placed fixed slide-rods, of two sets of oppositely-arranged grippers mounted upon said slide-rods and adapted for simultaneously gripping the two opposite margins of the sheet of baked biscuits, and means for simultaneously moving said grippers horizontally along the slide-rods, substantially as described.

5. In a machine for cutting up baked biscuits, the combination of a series of saw-edged knives vertically fixed in adjustable slotted bars and threaded together and through with tubes or bars, a series of plungers above said knives fitted with precision by saw-gate spaces to the knives, and means to move said plungers vertically between and out from the knives, substantially as described.

6. In a machine for cutting up sheets of baked biscuits, the combination of a set of stationary saw-edged cutting-knives, a series of rectangular plungers in size and shape like the said biscuits and their selvages, and means to move said plungers vertically with precision into and out from the said set of knives, substantially as described.

7. In a cutting-machine, the combination of two endless webs adapted for being moved upon rollers at different speeds; a slack web, tube or "trailer" obliquely suspended from a roller and a screw-worm scraper adapted for being operated through a series of geared wheels all substantially as and for the purposes herein set forth.

8. In a cutting-machine, the combination of a slack web or tube obliquely suspended from a roller and adapted for being revolved by means of the said roller when the latter is in motion and for trailing upon the surface beneath it all substantially as and for the purposes herein set forth.

WILLIAM ROBERTSON.
ANDREW ROBERTSON.

Witnesses:
JOSEPH LOCKWOOD,
ANDREW CHALMERS.